(12) United States Patent
De Jong et al.

(10) Patent No.: US 8,879,823 B2
(45) Date of Patent: Nov. 4, 2014

(54) COMBINED EXCHANGE OF IMAGE AND RELATED DATA

(75) Inventors: Pieter Wilhelmus Theodorus De Jong, Eindhoven (NL); Patric Theune, Eindhoven (NL); Mauritius Helenus Johannes Van Der Pot, Eindhoven (NL); Johannes Hubertina Petrus Wouters, Hunsel (NL)

(73) Assignee: Koninklijke Philips N.V., Eindhoven (NL)

( * ) Notice: Subject to any disclaimer, the term of this patent is extended or adjusted under 35 U.S.C. 154(b) by 1280 days.

(21) Appl. No.: 11/993,239

(22) PCT Filed: Jun. 19, 2006

(86) PCT No.: PCT/IB2006/051960
§ 371 (c)(1),
(2), (4) Date: Dec. 20, 2007

(87) PCT Pub. No.: WO2006/137000
PCT Pub. Date: Dec. 28, 2006

(65) Prior Publication Data
US 2010/0158351 A1   Jun. 24, 2010

(30) Foreign Application Priority Data
Jun. 23, 2005   (EP) .................................... 05105616

(51) Int. Cl.
G06K 9/00    (2006.01)
G06T 15/00   (2011.01)
G01C 3/14    (2006.01)
H04N 13/00   (2006.01)

(52) U.S. Cl.
CPC ....... *H04N 13/0048* (2013.01); *H04N 13/0059* (2013.01); *H04N 13/0022* (2013.01); *H04N 2213/005* (2013.01); *H04N 13/0066* (2013.01)
USPC .............................. 382/154; 345/419; 356/12

(58) Field of Classification Search
None
See application file for complete search history.

(56) References Cited

U.S. PATENT DOCUMENTS

| | | | |
|---|---|---|---|
| 2,000,912 A | 5/1935 | Bates | |
| 5,461,712 A | 10/1995 | Chelstowski | |
| 5,680,175 A * | 10/1997 | Yanai et al. | 348/441 |
| 5,986,804 A | 11/1999 | Mashitani | |
| 6,064,424 A | 5/2000 | Van Berkel | |

(Continued)

FOREIGN PATENT DOCUMENTS

| | | |
|---|---|---|
| JP | 9224264 A | 8/1997 |
| JP | 2000244810 A | 9/2000 |
| JP | 200277943 A | 3/2002 |

OTHER PUBLICATIONS

Alan Sullivan, A Solid-state Multi-Planar Volumetric Display, Proceedings of SID'03 Digest, pp. 1531-1533, ISSN/003-0966X.

(Continued)

*Primary Examiner* — Randolph I Chu

(57) ABSTRACT

A method of combined exchange of image data and further data being related to the image data, the image data being represented by a first two-dimensional matrix of image data elements and the further data being represented by a second two-dimensional matrix of further data elements is disclosed. The method comprises combining the first two-dimensional matrix and the second two-dimensional matrix into a combined two-dimensional matrix of data elements.

15 Claims, 6 Drawing Sheets

(56) References Cited

U.S. PATENT DOCUMENTS

Figure 1:
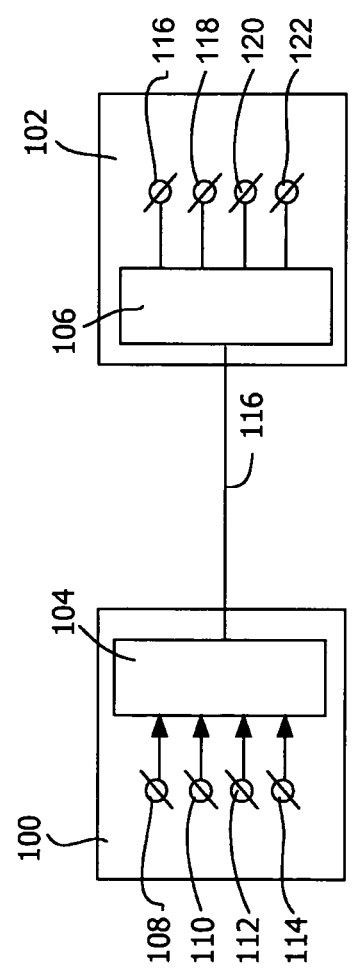

| | | | |
|---|---|---|---|
| 6,175,648 B1* | 1/2001 | Ayache et al. | 382/154 |
| 6,326,964 B1 | 12/2001 | Snyder | |
| 6,362,822 B1 | 3/2002 | Randel | |
| 6,535,629 B2 | 3/2003 | McCormick et al. | |
| 7,016,411 B2* | 3/2006 | Azuma et al. | 375/240.08 |
| 7,660,438 B2* | 2/2010 | Camus | 382/104 |
| 2002/0071616 A1 | 6/2002 | Yoshida | |
| 2002/0171743 A1* | 11/2002 | Kimizuka et al. | 348/222.1 |
| 2003/0058238 A1 | 3/2003 | Doak | |
| 2003/0198290 A1* | 10/2003 | Millin et al. | 375/240.01 |
| 2004/0120396 A1 | 6/2004 | Yun | |
| 2004/0240725 A1* | 12/2004 | Xu et al. | 382/154 |
| 2005/0053276 A1* | 3/2005 | Curti et al. | 382/154 |
| 2005/0286759 A1* | 12/2005 | Zitnick et al. | 382/154 |
| 2006/0209183 A1* | 9/2006 | Mashitani et al. | 348/51 |
| 2007/0110298 A1* | 5/2007 | Graepel et al. | 382/154 |
| 2010/0239158 A1* | 9/2010 | Rouge et al. | 382/154 |

OTHER PUBLICATIONS

D.F. McAllsiter, Stereo Computer Graphics and Other true 3-D Technologies, Princeton University Press, 1993.

P.A. Redert, et al., "Synthesis of Multi Viewpoint Images at Non-Intermediate Positions", Proceedings of Int'l Conference on Acoustics, Speech, and Signal Processing, vol. IV, ISBN 0-8186-7919-0, pp. 2749-2752, IEEE Computer Society, Los Alamitos, CA, 1997.

R.P. Berretty et al., "High-Quality Images from 2.5D Video", Proceedings of Eurographics 2003, Sep. 2003.

C. Lawrence et al., "High-Quality Video View Interpolation Using a Layered Representation", Proceedings of Siggraph 2004.

* cited by examiner

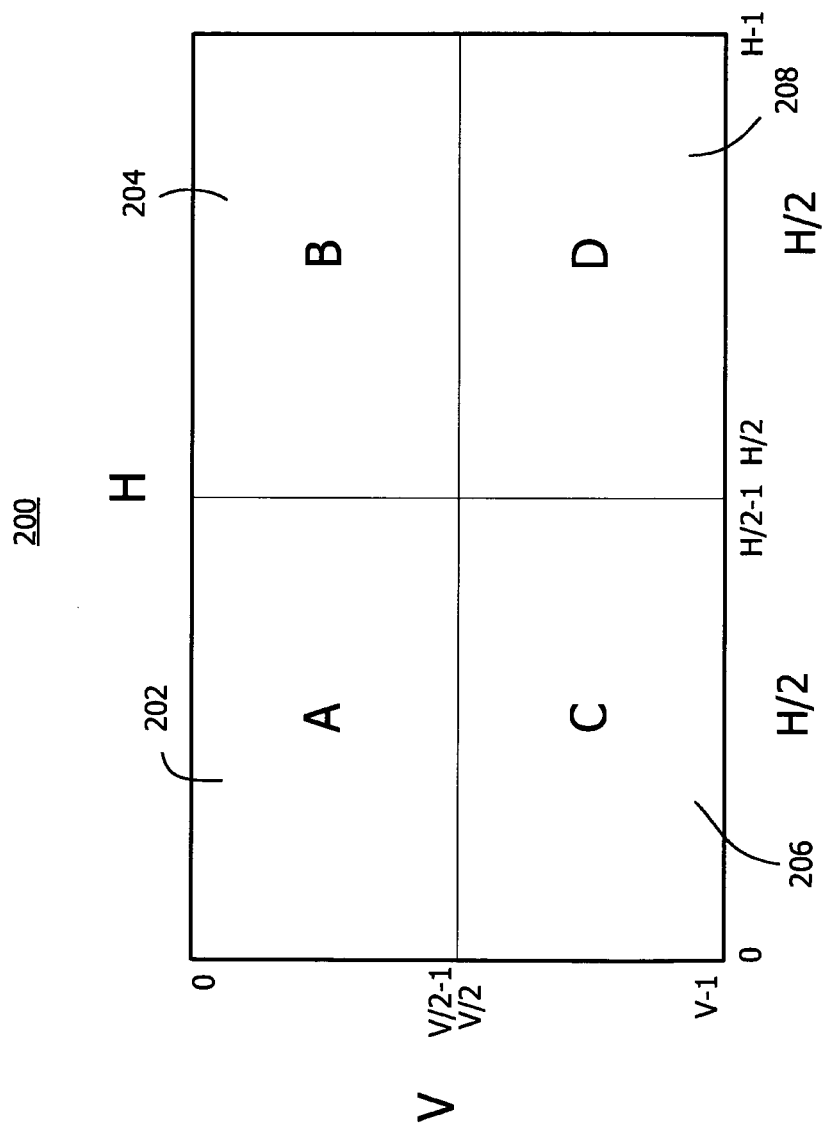

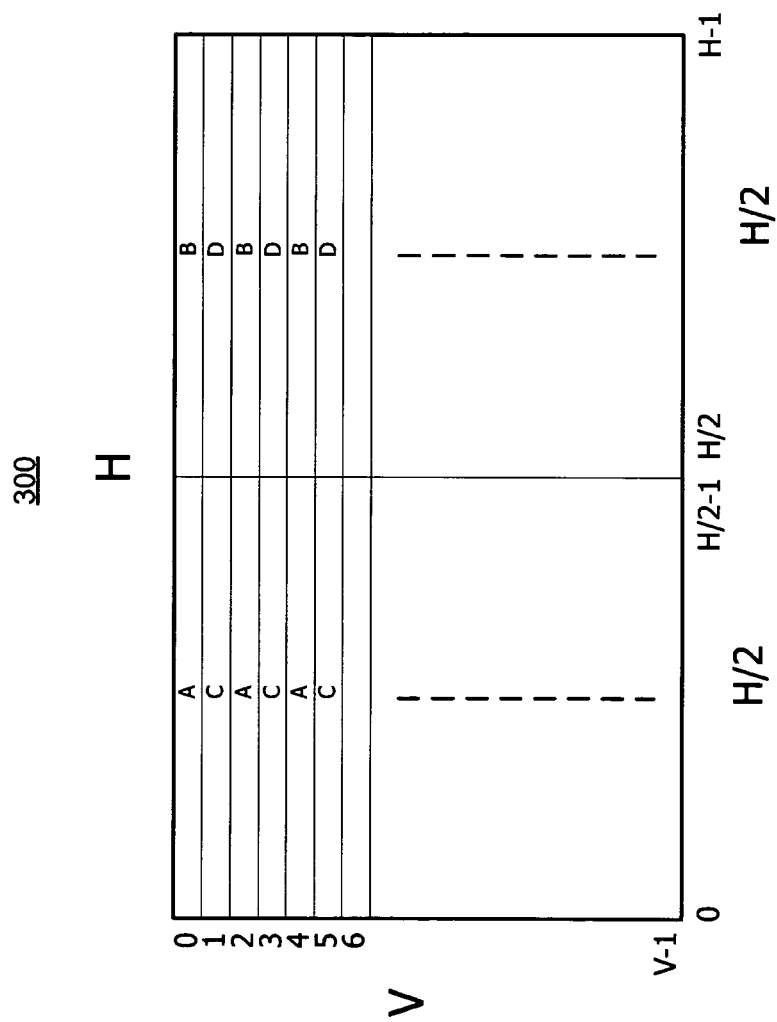

COMBINED EXCHANGE OF IMAGE AND RELATED DATA

The invention relates to methods of combined exchange of image data and further data being related to the image data, the image data being represented by a first two-dimensional matrix of image data elements and the further data being represented by a second two-dimensional matrix of further data elements.

The invention further relates to a transmitting unit for combined exchange of image data and further data being related to the image data.

The invention further relates to an image processing apparatus comprising such a transmitting unit.

The invention further relates to a receiving unit for combined exchange of image data and further data being related to the image data.

The invention further relates to a multi-view display device comprising such a receiving unit.

Since the introduction of display devices, a realistic 3-D display device has been a dream for many. Many principles that should lead to such a display device have been investigated. Some principles try to create a realistic 3-D object in a certain volume. For instance, in the display device as disclosed in the article "Solid-state Multi-planar Volumetric Display", by A. Sullivan in proceedings of SID'03, 1531-1533, 2003, visual data is displaced at an array of planes by means of a fast projector. Each plane is a switchable diffuser. If the number of planes is sufficiently high the human brain integrates the picture and observes a realistic 3-D object. This principle allows a viewer to look around the object within some extent. In this display device all objects are (semi-) transparent.

Many others try to create a 3-D display device based on binocular disparity only. In these systems the left and right eye of the viewer perceives another image and consequently, the viewer perceives a 3-D image. An overview of these concepts can be found in the book "Stereo Computer Graphics and Other True 3-D Technologies", by D. F. McAllister (Ed.), Princeton University Press, 1993. A first principle uses shutter glasses in combination with for instance a CRT. If the odd frame is displayed, light is blocked for the left eye and if the even frame is displayed light is blocked for the right eye.

Display devices that show 3-D without the need for additional appliances are called auto-stereoscopic display devices.

A first glasses-free display device comprises a barrier to create cones of light aimed at the left and right eye of the viewer. The cones correspond for instance to the odd and even sub-pixel columns. By addressing these columns with the appropriate information, the viewer obtains different images in his left and right eye if he is positioned at the correct spot, and is able to perceive a 3-D picture.

A second glasses-free display device comprises an array of lenses to image the light of odd and even sub-pixel columns to the viewer's left and right eye.

The disadvantage of the above mentioned glasses-free display devices is that the viewer has to remain at a fixed position. To guide the viewer, indicators have been proposed to show the viewer that he is at the right position. See for instance U.S. Pat. No. 5,986,804 where a barrier plate is combined with a red and green led. In case the viewer is well positioned he sees a green light, and a red light otherwise.

To relieve the viewer of sitting at a fixed position, multi-view auto-stereoscopic display devices have been proposed. See for instance U.S. patent No. 60/064,424 and US20000912. In the display devices as disclosed in U.S. No. 60/064,424 and US20000912 a slanted lenticular is used, whereby the width of the lenticular is larger than two sub-pixels. In this way there are several images next to each other and the viewer has some freedom to move to the left and right.

In order to generate a 3-D impression on a multi-view display device, images from different virtual viewpoints have to be rendered. This requires either multiple input views or some 3-D or depth information to be present. This depth information can be recorded, generated from multi-view camera systems or generated from conventional 2-D video material. For generating depth information from 2-D video several types of depth cues can be applied: such as structure from motion, focus information, geometric shapes and dynamic occlusion. The aim is to generate a dense depth map, i.e. per pixel a depth value. This depth map is subsequently used in rendering a multi-view image to give the viewer a depth impression. In the article "Synthesis of multi viewpoint images at non-intermediate positions" by P. A. Redert, E. A. Hendriks, and J. Biemond, in Proceedings of International Conference on Acoustics, Speech, and Signal Processing, Vol. IV, ISBN 0-8186-7919-0, pages 2749-2752, IEEE Computer Society, Los Alamitos, Calif., 1997 a method of extracting depth information and of rendering a multi-view image on basis of the input image and the depth map are disclosed. The multi-view image is a set of images, to be displayed by a multi-view display device to create a 3-D impression. Typically, the images of the set are created on basis of an input image. Creating one of these images is done by shifting the pixels of the input image with respective amounts of shift. These amounts of shifts are called disparities. So, typically for each pixel there is a corresponding disparity value, together forming a disparity map. Disparity values and depth values are typically inversely related, i.e.:

$$S = \frac{\alpha}{D} \quad (1)$$

with S being disparity, $\alpha$ a constant value and D being depth. Creating a depth map is considered to be equivalent with creating a disparity map. In this specification disparity values and depth values are both covered by the term depth related data elements.

The video data, i.e. the image signal and the corresponding depth data have to be exchanged between various image processing units and eventually to a display device, in particular a multi-view display device.

Existing video connections are designed to exchange sequences of images. Typically the images are represented by two-dimensional matrices of pixel values at both sides of the connection, i.e. the transmitter and receiver. The pixel values correspond to luminance and/or color values. Both transmitter and receiver have knowledge about the semantics of the data, i.e. they share the same information model. Typically, the connection between the transmitter and receiver is adapted to the information model. An example of this exchange of data is an RGB link. The image data in the context of transmitter and receiver is stored and processed in a data format comprising triplets of values: R (Red), G (Green) and B (Blue) together forming the different pixel values. The exchange of the image data is performed by means of three correlated but separated streams of data. These data streams are transferred by means of three channels. A first channel exchanges the Red values, i.e. sequences of bits representing the Red values, the second channel exchanges the Blue values and the third channel exchanges the Green values. Although the triplets of values are typically exchanged in series, the information model is such that a predetermined number of triplets together form an image, meaning that the triplets have respective spatial coordinates. These spatial coordinates correspond to the position of the triplets in the two-dimensional matrix representing the image.

Examples of standards, which are based on such an RGB link, are DVI (digital visual interface), HDMI (High Definition Multimedia Interface) and LVDS (low-voltage differential signaling). However in the case of 3-D, along with the video data, the depth related data has to be exchanged too.

It is an object of the invention to provide a method of the kind described in the opening paragraph, which is adapted to existing video interfaces.

This object of the invention is achieved in that the method comprises combining the first two-dimensional matrix and the second two-dimensional matrix into a combined two-dimensional matrix of data elements. The invention is based on the assumption that the information model at the transmitter and receiving side of a connection is shared. The image data elements of the first two-dimensional matrix and the further data elements are combined into a larger combined two-dimensional matrix of data elements in order to exchange the combined two-dimensional matrix once a connection which is arranged to exchange data elements which have a mutual spatial correlation. For the connection, i.e. the transmission channel, the semantics of the various data elements is not relevant.

A further advantage of combining the data elements of multiple two-dimensional matrices into a larger combined two-dimensional matrix is that many types of known image processing operations may be performed by standard processing components, e.g. a compression unit and/or a decompression unit.

The further data may be one of following:

Depth related data, meaning either depth values or disparity values, as explained above;

Further image data, meaning that the combined two-dimensional matrix comprises pixel values of multiple images; and De-occlusion data, see for explanation of this type of data the article "High-Quality Images from 2.5D Video", by R. P. Berretty and F. Ernst, in Proceedings of EUROGRAPHICS '03, September 2003 and the article "High-quality video view interpolation using a layered representation", by C. Lawrence Zitnick, Sing Bing Kang, Matthew Uyttendaele, Simon Winder, Richard Szeliski, in Proceedings of Siggraph 2004

The combined two-dimensional matrix may be solely based on the first and second two-dimensional matrix. But preferably the two-dimensional matrix also comprises data corresponding to more than two two-dimensional matrices.

An embodiment of the method according to the invention, further comprises combining second image data being represented by a third two-dimensional matrix into the combined two-dimensional matrix.

Another embodiment of the method according to the invention, further comprises combining second further data being represented by a fourth two-dimensional matrix into the combined two-dimensional matrix.

Basically, the combined two-dimensional matrix comprises data elements representing image, depth, disparity or de-occlusion information. The input data elements, i.e. the elements of the first, the second, the optional third and the optional fourth two-dimensional matrix are copied to output data elements to be placed in the combined two-dimensional matrix. The location in the combined two-dimensional matrix may be arbitrarily chosen as long as it matches with the shared information model. However it is preferred to place the output data elements in the combined two-dimensional matrix such that output data elements corresponding to respective input data elements, together forming a logical entity in one of the matrices of the set of the two-dimensional matrices, comprising the first, the second, the third and the fourth two-dimensional matrix, in a similar configuration. For example:

A block of input data elements is copied to form a block of output data elements in the combined two-dimensional matrix;

A row of input data elements is copied to form a row of output data elements in the combined two-dimensional matrix; or A column of input data elements is copied to form a column of output data elements in the combined two-dimensional matrix.

A "checkerboard pattern" is applied. That means that four input data elements from four input two-dimensional matrices are combined to blocks.

In an embodiment of the method according to the invention, the combined two-dimensional matrix is created by putting two matrices of the set of the two-dimensional matrices, comprising the first, the second, the third and the fourth two-dimensional matrix adjacent to each other in horizontal direction and two of the set of the two-dimensional matrices adjacent to each other in vertical direction.

In another embodiment of the method according to the invention, the rows of the combined two-dimensional matrix are filled by interleaving rows of the matrices of the set of the two-dimensional matrices, comprising the first, the second, the third and the fourth two-dimensional matrix. Preferably, a first one of the rows of the combined two-dimensional matrix comprises image data elements of the first row of the first two-dimensional matrix and further data elements of the first row of the second two-dimensional matrix. An advantage of this configuration is easy data access. For instance a process of rendering, for which both image data and depth related data is needed, may start as soon as only a portion of the combined two-dimensional matrix is exchanged. That means it is not needed to start with the rendering until all data elements are received.

An embodiment of the method according to the invention further comprises writing meta-data into the combined two-dimensional matrix. With meta-data, also called a header is meant descriptive data of the combined two-dimensional matrix. For instance, the name, the creation date, the horizontal size, the vertical size and the number of bits per output data element of the combined two-dimensional matrix are represented by the meta-data.

Exchange of information comprises sending and receiving. The method as described and discussed above is related to the sending part of the exchange of data. It is another object of the invention to provide a corresponding method which is related to the receiving part of the exchange of data and which is also adapted to existing video interfaces.

This object of the invention is achieved in that the corresponding method comprises extracting the first two-dimensional matrix and the second two-dimensional matrix from a combined two-dimensional matrix of data elements.

It is a further object of the invention to provide a transmitting unit of the kind described in the opening paragraph, which is adapted to existing video interfaces.

This object of the invention is achieved in that the transmitting unit comprises combining means for combining the first two-dimensional matrix and the second two-dimensional matrix into a combined two-dimensional matrix of data elements.

It is a further object of the invention to provide a receiving unit of the kind described in the opening paragraph, which is adapted to existing video interfaces.

This object of the invention is achieved in that the receiving unit comprises extracting means for extracting the first two-dimensional matrix and the second two-dimensional matrix from a combined two-dimensional matrix of data elements.

It is a further object of the invention to provide an image processing apparatus of the kind described in the opening paragraph, which is adapted to existing video interfaces.

This object of the invention is achieved in that the image processing apparatus comprises the transmitting unit as described above.

It is a further object of the invention to provide a multi-view display device of the kind described in the opening paragraph which is adapted to existing video interfaces.

This object of the invention is achieved in that the multi-view display device comprises the receiving unit as described above.

Modifications of the transmitting unit, the receiving unit, and variations thereof may correspond to modifications and variations thereof of the image processing apparatus, the multi-view display device and the methods being described.

Figure 2B:
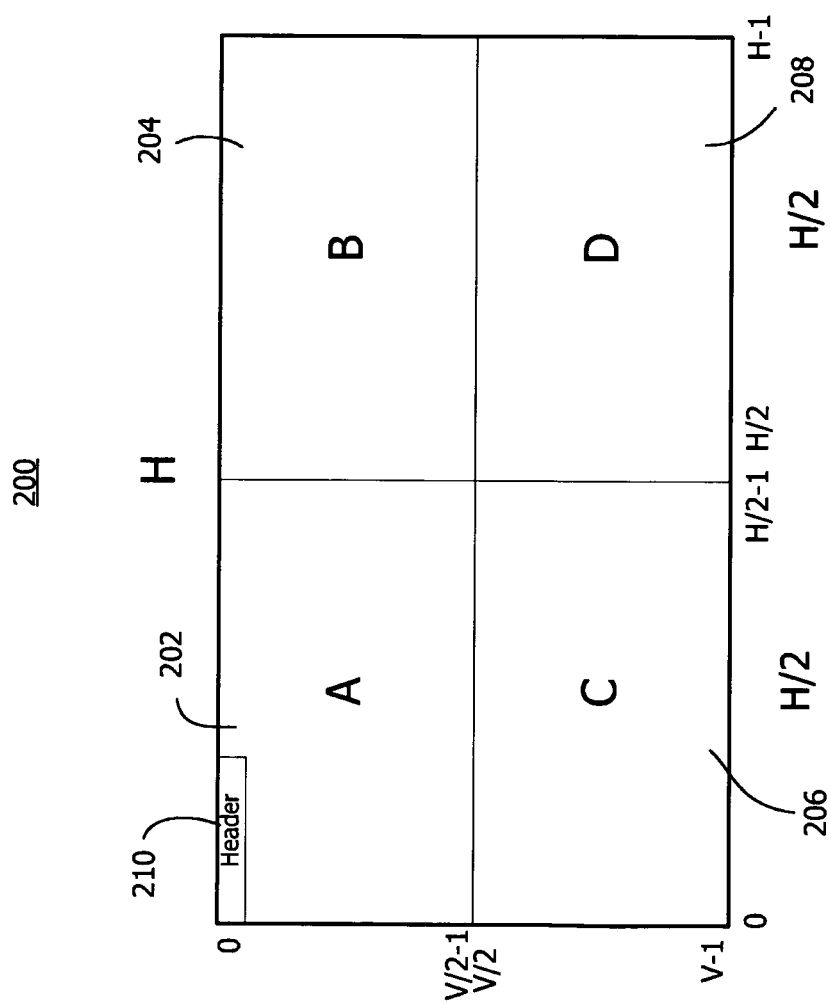
Figure 3B:
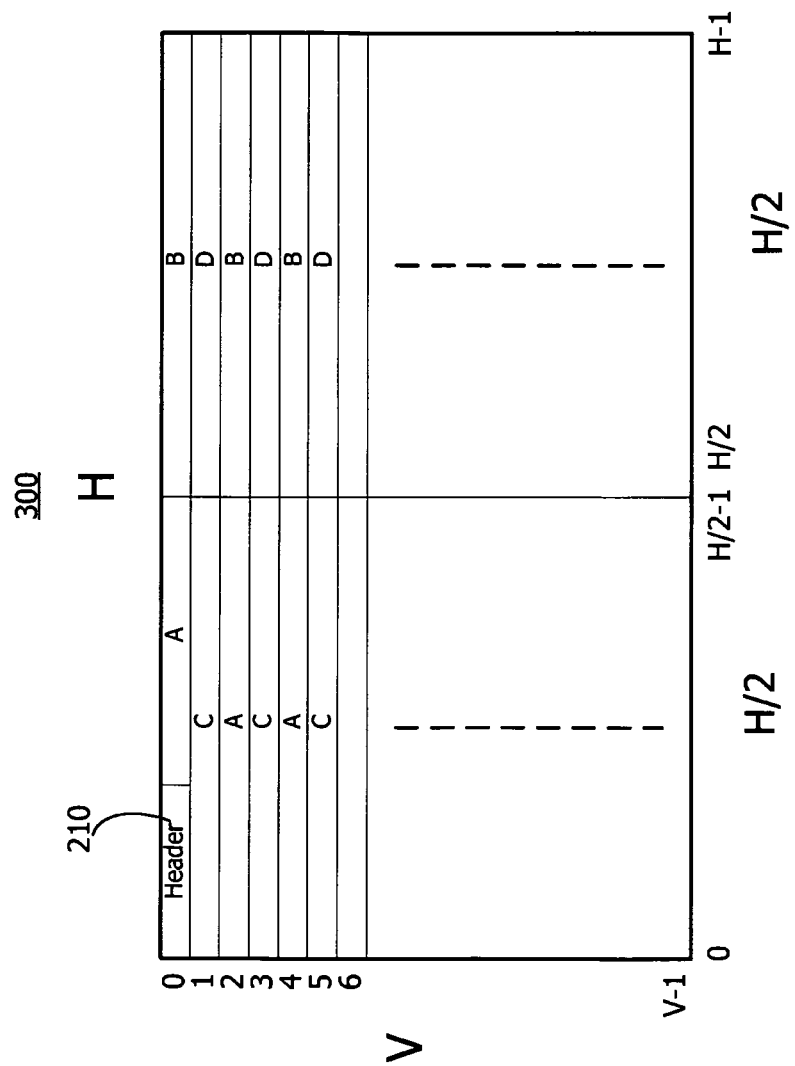
Figure 4:
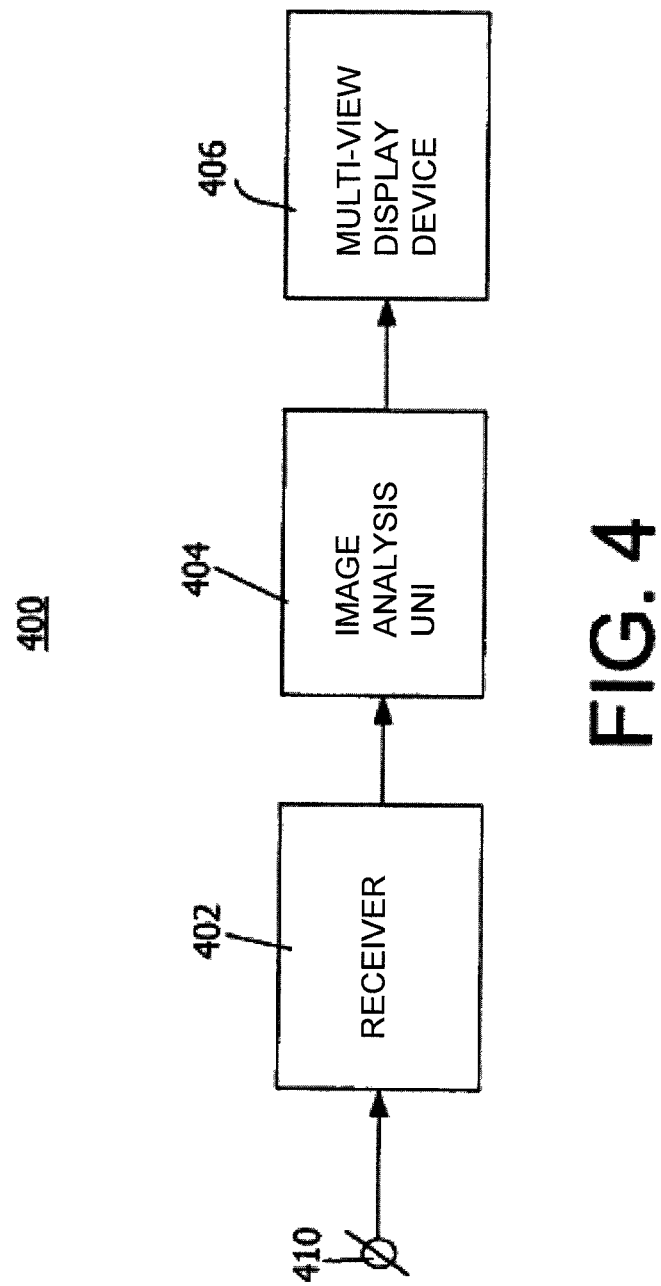

These and other aspects of the transmitting unit, the receiving unit, the image processing apparatus, the multi-view display device and the methods according to the invention will become apparent from and will be elucidated with respect to the implementations and embodiments described hereinafter and with reference to the accompanying drawings, wherein:

FIG. 1 schematically shows a first processing device connected to a second processing device;

FIG. 2A schematically shows a combined matrix based on 4 input matrices being disposed adjacent to each other;

FIG. 2B schematically shows the combined matrix of FIG. 2A comprising a header;

FIG. 3A schematically shows a combined matrix based on four input matrices whereby the rows of the input matrices are interleaved to form the combined matrix;

FIG. 3B schematically shows the combined matrix of FIG. 3A comprising a header; and FIG. 4 schematically shows an image processing apparatus comprising a multi-view display device, both according to the invention.

Same reference numerals are used to denote similar parts throughout the Figures.

FIG. 1 schematically shows a first processing device 100 connected to a second processing device 102. The first processing device 100 and the second processing device may be integrated circuits (IC) like an image processor and a display driver, respectively. Alternatively, the first processing device 100 is a more complex apparatus like a PC and the second processing device 102 is a multi-view display device, e.g. a monitor. The first 100 and second processing device 102 are connected by means of physical connections 116. The physical connections are e.g. based on twisted-pair or on twisted-pair plus ground for serial transport of data.

On top of the physical connections logical connections are realized. Each logical connection corresponds to a channel for transport of data between the first processing device 100 and the second processing device 102. For instance, there are three logical connections for transport of data, e.g. DVI. The fourth logical connection, for exchange of timing information, i.e. the clock signal is not taken into account.

The data format being applied within the context of the second processing device 102 is equal to the data format being applied within the context of the first processing device 100.

In order to exchange image data in combination with corresponding depth data, the first processing device 100 comprises a transmitting unit 104 according to the invention and the second processing device 102 comprises a receiving unit 106 according to the invention. The combination of the transmitting unit 104, the connection between the first 100 and second 102 processing device and the receiving unit 106 makes data exchange between the first 100 and second 102 processing device possible.

The transmitting unit 104 comprises a number of input interfaces 108-114, of which some are optional. The first input interface 108 is for providing a first two-dimensional matrix. The second input interface 110 is for providing a second two-dimensional matrix. The third input interface 112 is for providing a third two-dimensional matrix. The fourth input interface 114 is for providing a fourth two-dimensional matrix. The transmitting unit 104 comprises a processor for combining input data elements of at least two matrices of the set of the two-dimensional matrices, comprising the first, the second, the third and the fourth two-dimensional matrix into the combined two-dimensional matrix.

The combined two-dimensional matrix may be temporally stored within the transmitting unit 104 or the first processing device 100. It may also be that the data elements, which together form the combined two-dimensional matrix, are streamed to a receiving unit 106, synchronously with the combining of input data elements.

Preferably, the transmitting unit 104 comprises a serializer. Typically, the data elements are represented with a number of bits, which ranges from 8 to 12. The data on the physical connection is preferably exchanged by means of serial transport. For that reason the bits representing the consecutive data elements are put in a time sequential series.

In connection with FIGS. 2A, 2B, 3A and 3B examples of data formats of the combined two-dimensional matrix are disclosed which the transmitting unit 104 according to the invention is arranged to provide.

The processor for combining and the serializer may be implemented using one processor. Normally, these functions are performed under control of a software program product. During execution, normally the software program product is loaded into a memory, like a RAM, and executed from there. The program may be loaded from a background memory, like a ROM, hard disk, or magnetically and/or optical storage, or may be loaded via a network like Internet. Optionally an application specific integrated circuit provides the disclosed functionality.

The receiving unit 106 comprises a number of output interfaces 116-122, of which some are optional. The first output interface 116 is for providing a first two-dimensional matrix. The second output interface 118 is for providing a second two-dimensional matrix. The third output interface 120 is for providing a third two-dimensional matrix. The fourth output interface 122 is for providing a fourth two-dimensional matrix.

The receiving unit 106 comprises a processor for extracting input data elements corresponding to at least two matrices of the set of the two-dimensional matrices, comprising the first, the second, the third and the fourth two-dimensional matrix from the combined two-dimensional matrix of output data elements. In connection with FIGS. 2A, 2B, 3A and 3B examples of data formats of the combined two-dimensional matrix are disclosed which the receiving unit 106 according to the invention is arranged to receive and extract.

Normally, these functions are performed under control of a software program product. During execution, normally the software program product is loaded into a memory, like a RAM, and executed from there. The program may be loaded from a background memory, like a ROM, hard disk, or magnetically and/or optical storage, or may be loaded via a network like Internet. Optionally an application specific integrated circuit provides the disclosed functionality.

FIG. 2A schematically shows a combined two-dimensional matrix 200 based on a number of matrices of the set of the two-dimensional matrices, comprising the first, the second, the third and the fourth two-dimensional matrix. Output data elements which are based on input data elements of the first two-dimensional matrix are indicated with the character A. Output data elements which are based on input data elements of the second two-dimensional matrix are indicated with the character A. Output data elements which are based on input data elements of the third two-dimensional matrix are indicated with the character C. Output data elements which are based on input data elements of the fourth two-dimensional matrix are indicated with the character D.

The combined two-dimensional matrix has a horizontal size which is equal to H, meaning that the number of output data elements being adjacent in horizontal direction is equal to H. The combined two-dimensional matrix has a vertical size which is equal to V, meaning that the number of output data elements being adjacent in vertical direction is equal to V. Each of the set of the two-dimensional matrices, comprising the first, the second, the third and the fourth two-dimensional matrix as horizontal size which is equal to H/2 and has a vertical size which is equal to V/2.

In FIG. 2A it is indicated that all input data elements of the first two-dimensional matrix are mapped to a sub-matrix 202 of the combined two-dimensional matrix 200. In other words, output data elements which are based on input data elements of the first two-dimensional matrix logically form one block of output data elements.

In FIG. 2A it is indicated that all input data elements of the second two-dimensional matrix are mapped to a sub-matrix 204 of the combined two-dimensional matrix 200. In other words, output data elements which are based on input data elements of the second two-dimensional matrix logically form one block of output data elements.

In FIG. 2A it is indicated that all input data elements of the third two-dimensional matrix are mapped to a sub-matrix 206 of the combined two-dimensional matrix 200. In other words, output data elements which are based on input data elements of the third two-dimensional matrix logically form one block of output data elements.

In FIG. 2A it is indicated that all input data elements of the fourth two-dimensional matrix are mapped to a sub-matrix 208 of the combined two-dimensional matrix 200. In other words, output data elements which are based on input data elements of the fourth two-dimensional matrix logically form one block of output data elements.

The different rows in Table 1 below are examples of possible sources for the output data elements of the two-dimensional matrix. In other words, the row indicates the different types of data which are located in the different two-dimensional matrix of the set of two-dimensional matrices. For instance, the second row of Table 1 specifies that the first two-dimensional matrix comprises image data, the second two-dimensional matrix comprises depth data, the third two-dimensional matrix comprises occlusion data and the fourth two-dimensional matrix was empty.

TABLE 1

Examples of possible content of the combined two-dimensional matrix

| A | B | C | D |
|---|---|---|---|
| Image | Depth | Occlusion | Empty |
| Image | Depth | Image | Depth |
| Image | Image | Image | Image |
| Depth | Image | Depth | Image |
| Image | Depth | Occlusion | Depth |
| Image | Depth | Occlusion | Image |

FIG. 2B schematically shows the combined two-dimensional matrix 200 of FIG. 2A comprising a header 210. Preferably, the data elements representing the header is included in the combined two-dimensional matrix 200. That may result in overwriting other data elements, e.g. representing image or depth related data. However, preferably the header is stored in the combined two-dimensional matrix without overwriting other data elements. Alternatively, the header information is stored in a number of least significant bits, while the corresponding most significant bits are used to store other data elements, e.g. representing image or depth related data. Table 2 below specifies a number of attributes which preferably are comprised in the header.

TABLE 2

Data attributes of the header of the combined two-dimensional matrix

| Attribute | Description | Representation |
|---|---|---|
| Name | Name | String |
| Date | Creation date | String |
| Horizontal size | Number of adjacent data elements in horizontal direction | Integer |
| Horizontal size | Number of adjacent data elements in vertical direction | Integer |
| Word size | Number of bits per data element | Integer |
| Type indicator first two-dimensional matrix | Type of data of the first two-dimensional matrix | Enumerated type, e.g. [image, depth, disparity, occlusion, empty] |
| Type indicator second two-dimensional matrix | Type of data of the second two-dimensional matrix | Enumerated type, e.g. [image, depth, disparity, occlusion, empty] |

TABLE 2-continued

Data attributes of the header of the combined two-dimensional matrix

| Attribute | Description | Representation |
| --- | --- | --- |
| Type indicator third two-dimensional matrix | Type of data of the third two-dimensional matrix | Enumerated type, e.g. [image, depth, disparity, occlusion, empty] |
| Type indicator fourth two-dimensional matrix | Type of data of the fourth two-dimensional matrix | Enumerated type, e.g. [image, depth, disparity, occlusion, empty] |
| Horizontal sizes input | Number of adjacent data elements in horizontal direction of original two-dimensional matrices | Integer array, e.g. [500, 700, 400, 600] |
| Vertical sizes input | Number of adjacent data elements in vertical direction of original two-dimensional matrices | Integer array, e.g. [500, 700, 400, 600] |
| Mixing mode | Configuration of data elements | Enumerated type, e.g. [block, interleaved by row, interleaved by column, interleaved by two rows, interleaved by two columns, interleaved by row and column] |
| Content type | Classification of type of image data | Enumerated type, e.g. [movie, cartoon, advertisement, game, medical, video conference, nature, inside scene, outdoor scene, CAD design, scene with fast moving objects, scene with slow moving objects] |

Optionally, the type image has several subtypes, e.g. left image and right image. Optionally depth-rendering parameters are included in the header, e.g.:

a range parameter corresponding to the total range of depth, calculated from the maximum depth behind the screen to the maximum depth in front of the screen;

an offset parameter corresponding to the offset of the depth range to the display device;

a front of screen parameter corresponding to the maximum depth in front of the screen;

a behind the screen parameter corresponding to the maximum depth behind the screen;

the position of the viewer relative to the screen.

FIG. 3A schematically shows a combined two-dimensional matrix based on four input matrices whereby the rows of the input matrices are interleaved to form the combined two-dimensional matrix 300.

Output data elements which are based on input data elements of the first two-dimensional matrix are indicated with the character A. Output data elements which are based on input data elements of the second two-dimensional matrix are indicated with the character B. Output data elements which are based on input data elements of the third two-dimensional matrix are indicated with the character C. Output data elements which are based on input data elements of the fourth two-dimensional matrix are indicated with the character D.

The combined two-dimensional matrix has a horizontal size which is equal to H, meaning that the number of output data elements being adjacent in horizontal direction is equal to H. The combined two-dimensional matrix has a vertical size which is equal to V, meaning that the number of output data elements being adjacent in vertical direction is equal to V. Each of the set of the two-dimensional matrices, comprising the first, the second, the third and the fourth two-dimensional matrix as horizontal size which is equal to H/2 and has a vertical size which is equal to V/2.

The rows 0-6 of the combined two-dimensional matrix 300 are filled by interleaving rows of the matrices of the set of the two-dimensional matrices, comprising the first, the second, the third and the fourth two-dimensional matrix. It can be seen that the first row 0 of the combined two-dimensional matrix 300 comprises output data elements which are based on input data elements of the first two-dimensional matrix and of the second two-dimensional matrix. See the indications A and B. The first half of the first row 0 comprises output data elements corresponding to the first two-dimensional matrix and the second half of the first row 0 comprises output data elements corresponding to the second two-dimensional matrix.

It can be seen that the second row 1 of the combined two-dimensional matrix 300 comprises output data elements which are based on input data elements of the third two-dimensional matrix and of the fourth two-dimensional matrix. See the indications C and D. The first half of the second row 1 comprises output data elements corresponding to the third two-dimensional matrix and the second half of the second row 1 comprises output data elements corresponding to the fourth two-dimensional matrix.

Table 1 is also applicable for the combined two-dimensional matrix as depicted in FIG. 3A FIG. 3B schematically shows the combined two-dimensional matrix 300 of FIG. 3A comprising a header. Table 2 is also applicable for the combined two-dimensional matrix as depicted in FIG. 3B.

It should be noted that alternative ways of interleaving of data elements is also possible. For instance a number of data elements from the respective input two-dimensional matrix can be combined into groups. A number of alternatives are provided below, whereby the characters A,B,C,B have the meaning as expense above.

First Alternative:

ABCDABCDABCDABCDABCDABCDABCDABCDABCDABCDABCDABCD

ABCDABCDABCDABCDABCDABCDABCDABCDABCDABCDABCDABCD

ABCDABCDABCDABCDABCDABCDABCDABCDABCDABCDABCDABCD

Second Alternative:

ABABABABABABABABABABABABABABABABABABABABABABABAB

CDCDCDCDCDCDCDCDCDCDCDCDGDCDCDCDCDCDCDCDCDCDCDCD

ABABABABABABABABABABABABABABABABABABABABABABABAB

CDCDCDCDCDCDCDCDCDCDCDCDCDCDCDCDCDCDCDCDCDCDCDCD

FIG. 4 schematically shows an image processing apparatus 400 comprising a multi-view display device 406, both according to the invention. The image processing apparatus 400 comprises:

A receiver 402 for receiving a video signal representing input images;

An image analysis unit 404 for extracting depth related data from the input images; and A multi-view display device 406 for displaying multi-view images, which are rendered by the multi-view, display device on basis of the provided image data and related depth data.

The image data and related depth data are exchanged between the image analysis unit 404 and the multi-view display device 406, by means of a combined signal which represents the combined two-dimensional matrix as described in connection with FIGS. 2A, 2B, 3A and 3B. The image analysis unit 404 comprises a transmitting unit 104 as described in connection with FIG. 1. The multi-view display device 406 comprises a receiving unit 106 as described in connection with FIG. 1.

The video signal may be a broadcast signal received via an antenna or cable but may also be a signal from a storage device like a VCR (Video Cassette Recorder) or Digital Versatile Disk (DVD). The signal is provided at the input connector 410. The image processing apparatus 400 might e.g. be a TV. Alternatively the image processing apparatus 400 does not comprise the optional display device but provides the output images to an apparatus that does comprise a display device 406. Then the image processing apparatus 400 might be e.g. a set top box, a satellite-tuner, a VCR player, a DVD player or recorder. Optionally the image processing apparatus 400 comprises storage means, like a hard disk or means for storage on removable media, e.g. optical disks. The image processing apparatus 500 might also be a system being applied by a film-studio or broadcaster.

The multi-view display device 406 comprises a rendering unit 408, which is arranged to generate a sequence of multi-view images on basis of the received combined signal. The rendering unit 408 is arranged to provide (at least) two correlated streams of video images to the multi-view display device which is arranged to visualize a first series of views on basis of the first one of the correlated streams of video images and to visualize a second series of views on basis of the second one of the correlated streams of video images. If a user, i.e. viewer, observes the first series of views by his left eye and the second series of views by his right eye he notices a 3-D impression. It might be that the first one of the correlated streams of video images corresponds to the sequence of video images as received by means of the combined signal and that the second one of the correlated streams of video images is rendered by appropriate shifting on basis of the provided depth data. Preferably, both streams of video images are rendered on basis of the sequence of video images as received.

In the article "Synthesis of multi viewpoint images at non-intermediate positions" by P. A. Redert, B. A. Hendriks, and J. Biemond, in Proceedings of International Conference on Acoustics, Speech, and Signal Processing, Vol. IV, ISBN 0-8186-7919-0, pages 2749-2752, IEEE Computer Society, Los Alamitos, Calif., 1997 a method of extracting depth information and of rendering a multi-view image on basis of the input image and the depth map are disclosed. The image analysis unit 404 is an implementation for the disclosed method of extracting depth information. The rendering unit 408 is an implementation of the method of rendering disclosed in the article.

It should be noted that the above-mentioned embodiments illustrate rather than limit the invention and that those skilled in the art will be able to design alternative embodiments without departing from the scope of the appended claims. In the claims, any reference signs placed between parentheses shall not be constructed as limiting the claim. The word 'comprising' does not exclude the presence of elements or steps not listed in a claim. The word "a" or "an" preceding an element does not exclude the presence of a plurality of such elements. The invention can be implemented by means of hardware comprising several distinct elements and by means of a suitable programmed computer. In the unit claims enumerating several means, several of these means can be embodied by one and the same item of hardware or software. The usage of the words first, second and third, etcetera do not indicate any ordering. These words are to be interpreted as names.

The invention claimed is:

1. A method of combined exchange of at least image data and related depth data for auto-stereoscopic playback on a multi-view display using video interfaces, the method comprising acts of:
   receiving at least four two-dimensional matrices from a plurality of two-dimensional matrices having different data types selected at least from image data depth data;
   interleaving rows of the received at least four two-dimensional matrices into a combined two-dimensional matrix having horizontal and vertical sizes respectively indicating a number of output data elements adjacent in horizontal and vertical directions; and
   adding to the combined two-dimensional matrix a header including the horizontal and vertical sizes of the combined two-dimensional matrix.

2. The method as claimed in claim 1, wherein the image data is represented by two or more two-dimensional matrices.

3. The method as claimed in claim 1, wherein the depth data is represented by two or more two-dimensional matrices.

4. The method as claimed in claim 3, wherein the combined two-dimensional matrix is created by putting two or more image and depth two-dimensional matrices adjacent to each other in horizontal direction and two or more image and depth two-dimensional matrices adjacent to each other in vertical direction.

5. The method as claimed in claim 1, further comprising an act of writing meta-data into the header of the combined two-dimensional matrix.

6. The method as claimed in claim 1, wherein the different data types are selected from image data and a combination of image data and at least one of depth data, disparity data and occlusion data.

7. A method of combined exchange of at least image data and related depth data for auto-stereoscopic playback on a multi-view display using video interfaces, the method comprising acts of:
- receiving a combined two-dimensional matrix comprising interleaved rows of at least four two-dimensional matrices from a plurality of two-dimensional matrices having different data types selected at least from image data and depth data, the combined two-dimensional matrix having horizontal and vertical sizes respectively indicating a number of output data elements adjacent in horizontal and vertical directions; and
- extracting from the combined two-dimensional matrix a header including the horizontal and vertical sizes of the combined two-dimensional matrix.

8. The method as claimed in claim 7, wherein the different data type are selected from image data and a combination of image data and at least one of depth data, disparity data and occlusion data.

9. An apparatus for combined exchange of at least image data and related depth data for auto-stereoscopic playback on a multi-view display using video interfaces, the apparatus comprising:
- a receiver for receiving at least four two-dimensional matrices from a plurality of two-dimensional matrices having different data types selected at least from image data and depth data; and
- a processor for
- interleaving rows of the received at least four two-dimensional matrices into a combined two-dimensional matrix having horizontal and vertical sizes respectively indicating a number of output data elements adjacent in horizontal and vertical directions, and
- adding to the combined two-dimensional matrix a header including the horizontal and vertical sizes of the combined two-dimensional matrix.

10. The apparatus as in claim 9, wherein the apparatus is an image processing apparatus.

11. The apparatus as in claim 9, wherein the different data type are selected from image data and a combination of image data and at least one of depth data, disparity data and occlusion data.

12. An apparatus for combined exchange of at least image data and related depth data for auto-stereoscopic playback on a multi-view display using video interfaces, comprising:
- a receiver for receiving a combined two-dimensional matrix comprising interleaved rows of at least four two-dimensional matrices from a plurality of two-dimensional matrices having different data types selected at least from image data and depth data, the combined two-dimensional matrix having horizontal and vertical sizes respectively indicating a number of output data elements adjacent in horizontal and vertical directions; and
- a processor for extracting from the combined two-dimensional matrix a header including the horizontal and vertical sizes of the combined two-dimensional matrix.

13. The apparatus as in claim 12, wherein the apparatus is an image processing apparatus.

14. The apparatus as in claim 13, further comprising a display for displaying images rendered on basis of the combined two-dimensional matrix.

15. The apparatus as in claim 12, wherein the different data type are selected from image data and a combination of image data and at least one of depth data, disparity data and occlusion data.

* * * * *